United States Patent
Kim (10) Patent No.: US 10,133,740 B2
(45) Date of Patent: Nov. 20, 2018

(54) TRANSLATION APPARATUS AND CONTROL METHOD THEREOF

(71) Applicant: SAMSUNG ELECTRONICS CO., LTD., Suwon-si (KR)

(72) Inventor: Hak-jung Kim, Goyang-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 23 days.

(21) Appl. No.: 15/375,293

(22) Filed: Dec. 12, 2016

(65) Prior Publication Data

US 2017/0091179 A1    Mar. 30, 2017

Related U.S. Application Data

(63) Continuation of application No. PCT/KR2016/008117, filed on Jul. 25, 2016.

(30) Foreign Application Priority Data

Aug. 7, 2015  (KR) .................. 10-2015-0111671

(51) Int. Cl.
  *G06F 17/00* (2006.01)
  *G06F 17/28* (2006.01)
  *G06F 17/22* (2006.01)

(52) U.S. Cl.
  CPC ........ *G06F 17/289* (2013.01); *G06F 17/2235* (2013.01); *G06F 17/2288* (2013.01)

(58) Field of Classification Search
  CPC .............................. G06F 17/28; G06F 7/289
  USPC .......................................................... 704/7
  See application file for complete search history.

(56) References Cited

U.S. PATENT DOCUMENTS

| 6,047,252 A | 4/2000 | Kumano et al. |
| 8,494,836 B2 * | 7/2013 | Shiratori ............. G06F 17/2836 704/2 |
| 8,972,848 B2 | 3/2015 | Oyarzabal et al. |
| 2002/0161634 A1 | 10/2002 | Kaars |

(Continued)

FOREIGN PATENT DOCUMENTS

| EP | 0 867 815 A2 | 9/1998 |
| EP | 0 939 370 A1 | 9/1999 |

(Continued)

OTHER PUBLICATIONS

Written Opinion dated Oct. 31, 2016 issued by International Searching Authority in counterpart International Application No. PCT/KR2016/008117 (PCT/ISA/237).

(Continued)

*Primary Examiner* — Daniel Abebe
(74) *Attorney, Agent, or Firm* — Sughrue Mion, PLLC (57) ABSTRACT

A control method includes receiving a sentence and link information about the sentence, outputting a first translation sentence by retranslating the sentence into a language corresponding to a user command by using a translation engine, in response to the translation engine being updated, generating a second translation sentence by retranslating the sentence, and outputting the second translation sentence and the link information. Therefore, the translation apparatus improves a quality of translation sentence, which is translated before a translation engine is updated, through the translation engine that is updated as a latest version.

15 Claims, 8 Drawing Sheets

(56) References Cited

U.S. PATENT DOCUMENTS

| | | | |
|---|---|---|---|
| 2003/0101043 | A1 | 5/2003 | Boegelund et al. |
| 2006/0195783 | A1 | 8/2006 | Davis et al. |
| 2011/0077935 | A1* | 3/2011 | Viswanadha ..... G06F 17/30899 |
| | | | 704/7 |
| 2011/0231181 | A1 | 9/2011 | Furuuchi et al. |
| 2012/0072202 | A1 | 3/2012 | Chiu et al. |
| 2012/0296632 | A1* | 11/2012 | Shiratori ............. G06F 17/2836 |
| | | | 704/3 |
| 2014/0052702 | A1 | 2/2014 | Fierro et al. |
| 2015/0106076 | A1* | 4/2015 | Hieber ................ G06F 17/2827 |
| | | | 704/2 |

FOREIGN PATENT DOCUMENTS

| | | | |
|---|---|---|---|
| JP | 5-108706 A | 4/1993 | |
| JP | 5-108714 A | 4/1993 | |

OTHER PUBLICATIONS

International Search Report dated Oct. 31, 2016 issued by International Searching Authority in counterpart International Application No. PCT/KR2016/008117 (PCT/ISA/210).

\* cited by examiner

TRANSLATION APPARATUS AND CONTROL METHOD THEREOF

CROSS-REFERENCE TO RELATED APPLICATIONS

This application is a bypass continuation application of International Application No. PCT/KR2016/008117, filed on Jul. 25, 2016, which claims priority from Korean Patent Application No. 10-2015-0111671, filed on Aug. 7, 2015, in the Korean Intellectual Property Office, the disclosures of which are incorporated herein by reference in their entireties.

BACKGROUND

Field

Apparatuses and methods consistent with exemplary embodiments relate to a translation apparatus and a control method thereof, and more particularly, to a translation apparatus that performs a translation through an updated translation engine module, and a control method thereof.

Description of the Related Art

In general, a translation apparatus translates a source language into a target language by using a translation engine module to which various types of methods, such as rule-based, pattern-based, and statistics-based methods, are applied.

The translation engine module has been periodically updated according to various event situations. Therefore, a meaning of a target language that is translated through an updated translation engine module may be more smoothly transmitted than a meaning of a target language that is translated through a non-updated version of a translation engine module.

In other words, a translation quality level of a target language that is translated through a translation engine module updated as a latest version in relation to a source language requested by a user is higher than a translation quality level of a target language that is translated through a previous version of a translation engine module.

Nevertheless, the translation engine module updated as the latest version translates a merely currently requested source language into a high-quality target language and thus is not more efficiently used.

SUMMARY

Exemplary embodiments may overcome the above disadvantages and other disadvantages not described above. Also, exemplary embodiments are not required to overcome the disadvantages described above, and an exemplary embodiment may not overcome any of the problems described above.

One or more exemplary embodiments provide efficiently using a latest version of a translation engine module.

One or more exemplary embodiments provide improving a quality of a translation sentence, which is translated before a translation engine module is updated as a latest version, through the translation engine module updated as the latest version.

According to an aspect of an exemplary embodiment, there is provided a control method of a translation apparatus, the method including receiving a sentence and link information about the sentence, outputting a first translation sentence by translating the sentence into a language corresponding to a user command by using a translation engine, in response to the translation engine being updated, generating a second translation sentence by translating the sentence, and outputting the second translation sentence and the link information.

In response to the sentence being a whole sentence in a webpage, the link information may include address information of the webpage.

In response to the sentence being a partial sentence in the webpage, the link information may include address information of the webpage and position information of the sentence.

The position information may be information acquired from a source program configuring the webpage.

In response to the sentence being a whole sentence in an electronic document, the link information may include route information where the electronic document is stored.

In response to the sentence being a partial sentence in an electronic document, the link information may include route information where the electronic document is stored and position information of the sentence.

In response to the electronic document being a document of an office open file form, the position information may be information acquired from Extensible Mark-up Language (XML) schema information forming the electronic document.

In response to the electronic document being a document of an office file form, the position information may be information acquired based on an Application Program Interface (API) source opened in relation to the electronic document.

The outputting of the second translation sentence may include, in response to link information related to the first translation sentence being additionally received after the first translation sentence is output, outputting the second translation sentence, the link information, and the additionally received link information.

According to another aspect of an exemplary embodiment, there is provided a translation apparatus including a communicator configured to receive a sentence and link information about the sentence, a language converter configured to translate the sentence into a language corresponding to a user command through a translation engine, an output interface configured to output a first translation sentence translated according to the sentence, and a controller configured to update the translation engine according to updated version information and control the language converter and the output interface to retranslate and output the sentence into a second translation sentence through the updated translation engine. The output interface may be further configured to output the second translation sentence retranslated through the updated translation engine and the link information.

In response to the sentence being a whole sentence in a webpage, the link information may include address information of the webpage.

In response to the sentence being a partial sentence in a webpage, the link information may include address information of the webpage and position information of the sentence.

The position information may be information acquired from a source program forming the webpage.

In response to the sentence being a partial sentence in an electronic document, the link information may include route information where the electronic document is stored.

In response to the sentence being a partial sentence in an electronic document, the link information may include route information where the electronic document is stored and position information of the sentence.

In response to the electronic document being a document of an office open file form, the position information may be information acquired from XML schema information forming the electronic document.

In response to the electronic document being a document of an office file form, the position information may be information acquired based on an API source opened in relation to the electronic document.

In response to link information related to the first translation sentence, being additionally received after the first translation sentence is output, the controller may control the output unit to output the second translation sentence, the link information, and the additionally received link information.

According to one or more exemplary embodiments, a translation apparatus may improve a quality of a translation sentence, which is translated before a translation engine module is updated as a latest version, through the translation engine module updated as the latest version.

Additional and/or other aspects and advantages will be set forth in part in the description which follows and, in part, will be obvious from the description, or may be learned by practice.

BRIEF DESCRIPTION OF THE DRAWINGS

The above and/or other aspects will be more apparent by describing exemplary embodiments with reference to the accompanying drawings, in which.

DETAILED DESCRIPTION OF EXEMPLARY EMBODIMENTS

Exemplary embodiments will now be described in greater detail with reference to the accompanying drawings.

In the following description, same drawing reference numerals are used for the same elements even in different drawings. The matters defined in the description, such as detailed construction and elements, are provided to assist in a comprehensive understanding of exemplary embodiments. Thus, it is apparent that the exemplary embodiments can be carried out without those specifically defined matters. Also, well-known functions or constructions may not be described in detail if they would obscure the description with unnecessary detail.

Figure 1:
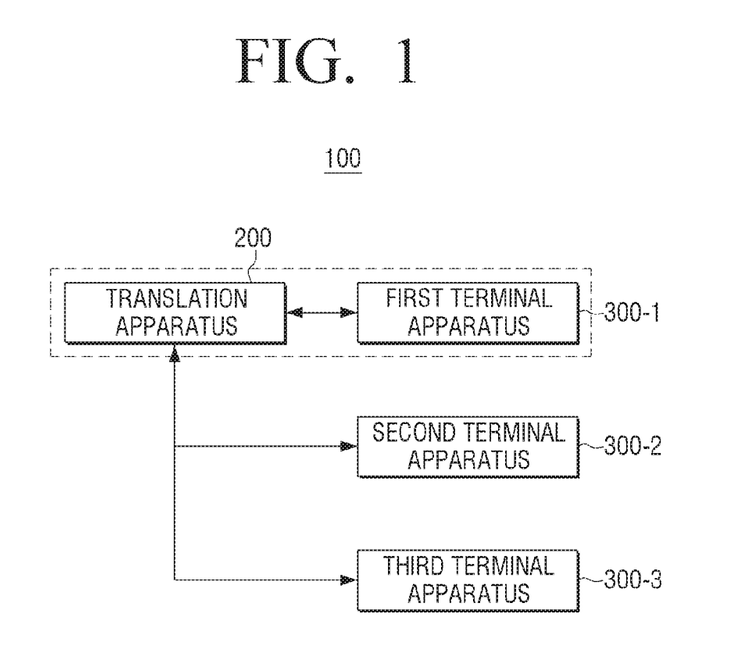
FIG. 1 is a block diagram of a schematic configuration of a translation system that provides a translation service, according to an exemplary embodiment.

FIG. 1 is a block diagram of a schematic configuration of a translation system 100 that provides a translation service, according to an exemplary embodiment.

As shown in FIG. 1, the translation system 100 that provides the translation service includes a translation apparatus 200 and a plurality of terminal apparatuses 300-1 through 300-3 (hereinafter referred to as first through third terminal apparatuses).

Here, the translation apparatus 200 may be an apparatus that converts an input or received sentence input or received into a language corresponding to a corresponding user command according to a user request. The translation apparatus 200 may be built on a web server providing a web service environment described above or may be independently realized.

If translation request information is received from at least one of the first through third terminal apparatuses 300-1 through 300-3 capable of performing data communications with the translation apparatus 200, the translation apparatus 200 translates a sentence included in the received translation request information into a language corresponding to a user command through a translation engine module. Thereafter, the translation apparatus 200 transmits a translation sentence (hereinafter referred to as a first translation sentence) translated into a language corresponding to a user command in relation to a corresponding sentence to a terminal apparatus 300 that transmits translation request information.

Therefore, the terminal apparatus 300 may convert a sentence input or selected by a user into the translation sentence received from the translation apparatus 200 and display the translation sentence.

The above-described translation request information may include link information indicating the sentence input or selected by the user and a position of the corresponding sentence. Therefore, if the translation request information is received, the translation apparatus 200 may generate and store metadata including the sentence and the link information included in the received request information. The translation apparatus 200 may additionally generate and store metadata including language information about the first translation sentence translated in relation to the corresponding sentence along with the sentence and the link information included in the received translation request information.

If a translation engine module is updated as a new version, the translation apparatus 200 retranslates the stored sentence included in the metadata into a language requested by the user by using the updated translation engine module. Thereafter, the translation apparatus 200 acquires the link information from the metadata including the sentence and transmits the retranslated translation sentence (hereinafter referred to as a second translation sentence) and the link information to one terminal apparatus 300 of the first through third terminal apparatuses 300-1 through 300-3 with reference to the acquired link information.

Therefore, the terminal apparatus 300 may convert a first translation sentence translated through a translation engine module corresponding to a previous version into a second translation sentence retranslated through a translation engine module updated as a new version based on the link information received from the translation apparatus 200.

As described above, the translation apparatus 200 may be built on a web server providing the above-mentioned web service environment. In this case, the web server may acquire a content related to the corresponding link information from a plurality of pre-stored contents with reference to the link information output from the translation apparatus 200, convert the first translation sentence included in the acquired content into the retranslated second translation sentence through the translation engine module updated as the new version, and store the retranslated second translation sentence.

The translation system 100 that provides the translation service according to an exemplary embodiment has been described in brief. The translation apparatus 200 according to an exemplary embodiment will now be described in more detail.

Figure 2:
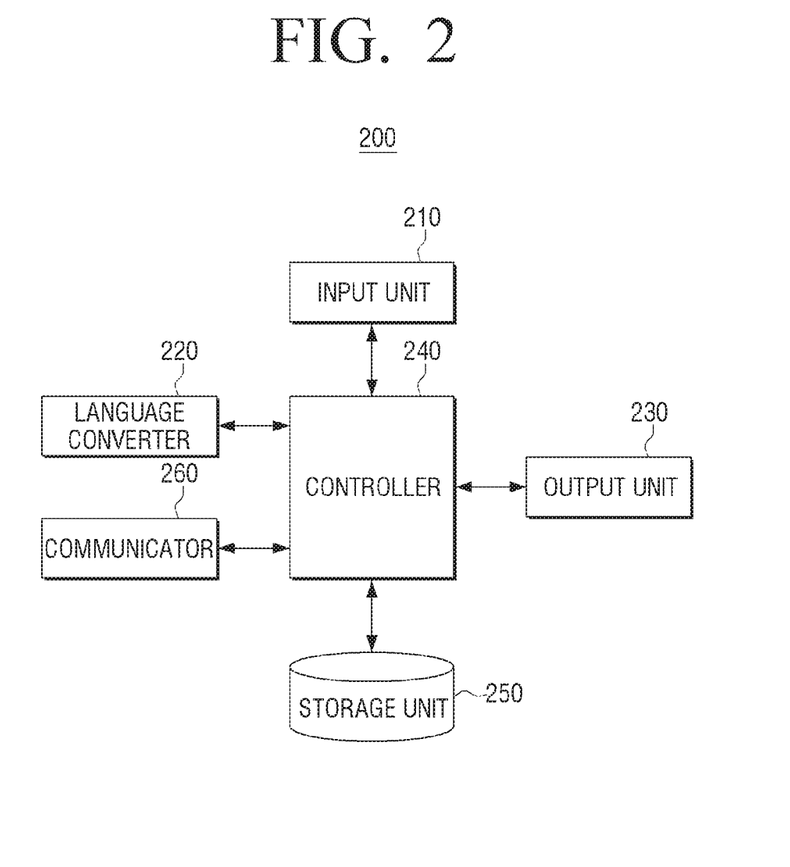
FIG. 2 is a block diagram of a translation apparatus according to an exemplary embodiment.

FIG. 2 is a block diagram of the translation apparatus 200, according to an exemplary embodiment.

As shown in FIG. 2, the translation apparatus 200 may include an input unit 210 (e.g., input interface), a language converter 220, an output unit 230 (e.g., output interface), a controller 240, a storage unit 250 (e.g., memory), and a communicator 260. In an exemplary embodiment, there may be at least one processor which implements the language converter 220, the output unit 230, and the controller 240. In another embodiment, there may be a single processor which implements the language converter 220, the output unit 230, and the controller 240.

The input unit 210 receives a sentence and link information about the sentence from the terminal apparatus 300. According to an exemplary embodiment, if the translation apparatus 200 is built on a web server providing a web service environment, the input unit 210 may receive a sentence, which is requested by a user to be translated and received from the terminal apparatus 300, such as a smartphone, a personal computer (PC), a tablet PC, or the like, and link information about the sentence through the communicator 260 that will be described later. If the translation apparatus 200 is independently realized, the input unit 210 may receive the sentence requested by the user to be translated and the link information from the terminal apparatus 300 through the communication 260 that will be described later.

If the sentence requested by the user to be translated and the link information about the corresponding sentence are input or received through the input unit 210 or the communicator 260 as described above, the language converter 220 translates the sentence requested to be translated into a language corresponding to a user command through a translation engine module. The output unit 230 outputs a first translation sentence translated into the language corresponding to the user command in relation to the input sentence from the language converter 220.

The controller 240 controls overall operations of a plurality of elements configuring the translation apparatus 200. In particular, the controller 240 updates the translation engine module according to update version information and, if the translation engine module is updated, controls the language converter 220 to translate a sentence, which is translated into a first translation sentence, into a language corresponding to the first translation sentence through the updated translation engine module.

According to a control command as described above, the language converter 220 translates the sentence translated into the first translation sentence into the language corresponding to the first translation sentence by using the updated translation engine module. If the corresponding sentence is translated into a second translation sentence through the updated translation engine module, the output unit 230 outputs the second translation sentence retranslated in relation to the sentence translated into the first translation sentence and link information related to the corresponding sentence.

If the second translation sentence and the link information are output, a first translation sentence pre-translated in relation to a sentence requested to be translated according to the following exemplary embodiment may be translated into a second translation sentence.

According to an exemplary embodiment, if the translation apparatus 200 is built on a web server providing a web service environment, a processor of the web server acquires a content including an existing translated first translation sentence from a plurality of pre-stored contents based on the link information output through the output unit 230 of the translation apparatus 200. Thereafter, the web server may track the existing translated first translation sentence from the acquired content based on the link information and convert the tracked first translation sentence into a retranslated second translation sentence.

If the translation apparatus 200 is independently realized, the controller 240 controls the communicator 260 to transmit the second translation sentence and the link information to the terminal apparatus 300 corresponding to identification information included in the link information output through the output unit 230. According to a control command as described above, the communicator 260 transmits the second translation sentence and the link information to the terminal apparatus 300 corresponding to the identification information included in the link information. Therefore, the terminal apparatus 300 acquires a content including the existing translated first translation sentence based on the link information received from the translation apparatus 200. Thereafter, the terminal apparatus 300 may track the existing translated first translation sentence from the acquired content based on the link information and convert the tracked first translation sentence into the retranslated second sentence.

The storage unit 250 may store a metadata form including at least one selected from a sentence input through the input unit 210 or received through the communicator 260, link information, and language information for translating the sentence.

Therefore, if a translation engine module is updated, the language converter 220 may acquire a sentence translated into a first translation sentence from metadata stored in the storage unit 250 and retranslate the acquired sentence into a second translation sentence through the updated translation engine module. Also, the output unit 230 may output the retranslated second translation sentence and link information included in the corresponding metadata.

If a sentence input through the input unit 210 or received through the communicator 260 is a whole sentence included in a webpage, link information may include address information about the corresponding webpage, and the sentence and the link information related to the sentence may be generated in a metadata form and then stored in the storage unit 250.

In this case, if a translation engine module is updated, the language converter 220 acquires a sentence translated into a first translation sentence from metadata pre-stored in the storage unit 250. Thereafter, the language converter 220 retranslates the corresponding sentence by using the updated translation engine module. If the sentence is translated into a second translation sentence, the output unit 230 outputs link information included in the corresponding metadata and the retranslated second translation sentence. Therefore, the terminal apparatus 300 such as a web server determines a webpage including a first translation sentence pre-translated in relation to a whole sentence translation based on link information output from the translation apparatus 200 and converts the first translation sentence of the determined webpage into a second translation sentence.

If a sentence input through the input unit 210 or received through the communicator 260 is a partial sentence included in a webpage, link information may include address information and position information about the corresponding webpage. Here, according to an exemplary embodiment, the position information may be code information corresponding to a sentence to be translated from a source program of a Hypertext Markup Language (HTML) form forming a webpage or information where the corresponding code information is positioned. A sentence as described above and link information related to the sentence may be generated in a metadata form and then stored in the storage unit 250.

In this case, if a translation engine module is updated, the language converter 220 acquires a sentence translated into a first translation sentence from metadata pre-stored in the storage unit 250. Thereafter, the language converter 220 retranslates the corresponding sentence by using the updated translation engine module. If the sentence is translated into a second translation sentence, the output unit 230 outputs link information included in the corresponding metadata and the retranslated second translation sentence. Therefore, the terminal apparatus 300 such as a web server determines a webpage including a first translation sentence pre-translated in relation to a partial sentence based on link information output from the translation apparatus 200. Thereafter, the terminal apparatus 300 tracks the first translation sentence pre-translated in relation to the partial sentence from the determined webpage based on the position information included in the link information and converts the tracked first translation sentence into a second translation sentence.

If a sentence input through the input unit 210 or received through the communicator 260 is a whole sentence included in an electronic document, link information may include route information where the electronic document is stored, and the sentence and the link information related to the sentence may be generated in a metadata form and then stored in the storage unit 250.

In this case, if a translation engine module is updated, the language converter 220 acquires a sentence translated into a first translation sentence from metadata pre-stored in the storage unit 250. Thereafter, the language converter 220 retranslates the corresponding sentence by using the updated translation engine module. If the sentence is retranslated into a second translation sentence, the communicator 260 extracts identification information from the link information included in the corresponding metadata and transmits the retranslated second translation sentence and the link information to the terminal apparatus 300 corresponding to the extracted identification information. Therefore, the terminal apparatus 300, such as a smartphone, a tablet PC, a PC, or the like, extracts an electronic document including a first translation sentence pre-translated in relation to a whole sentence translation based on route information included in the link information received from the translation apparatus 200 and converts the first translation sentence of the extracted electronic document into a second translation sentence.

If a sentence input through the input unit 210 or received through the communicator 260 is a partial sentence included in an electronic document, link information may include route information where the corresponding electronic document is stored and position information of the corresponding sentence.

Here, if the electronic document is a document of an office open file form having an extension such as docx, docm, pptx, xlsx, or the like, the position information may be information acquired from Extensible Markup Language (XML) schema information forming the electronic document according to an exemplary embodiment. If the electronic document is a document of an office file form having an extension such as doc, ppt, xls, or the like, the position information may be information acquired based on an Application Program Interface (API) source opened in relation to the electronic document.

A sentence as described above and link information related to the sentence may be generated in a metadata form and then stored in the storage unit 250. In this case, if a translation engine module is updated, the language converter 220 acquires a sentence translated into a first translation sentence from metadata pre-stored in the storage unit 250. Thereafter, the language converter 220 retranslates the corresponding sentence by using the updated translation engine module. If the sentence is retranslated into a second translation sentence, the communicator 260 extracts identification information from the link information included in the corresponding metadata and transmits the retranslated second translation sentence and the link information to the terminal apparatus 300 corresponding to the extracted identification information. Therefore, the terminal apparatus 300, such as a smartphone, a tablet PC, or a PC, extracts an electronic document including a first translation sentence pre-translated in relation to a partial sentence based on route information included in link information received from the translation apparatus 200. Thereafter, the terminal apparatus 300 tracks a first translation sentence pre-translated in relation to a partial sentence translation from an electronic document pre-extracted based on position information included in link information and converts the tracked first translation sentence into a second translation sentence.

If link information related to a first translation sentence is additionally received after the first translation sentence translated in relation to a sentence requested to be translated is output, the controller 240 controls the output unit 230 to output a second translation sentence, link information, and the additionally received link information. For example, if a first translation sentence related to a first sentence requested to be translated among sentences included in a first electronic document is received from the translation apparatus 200, the terminal apparatus 300 converts a first translation sentence into the received first translation sentence. As described above, when the first sentence included in the first electronic document is converted into the first translation sentence, the terminal apparatus 300 may convert a second sentence of sentences included in a second electronic document into the first translation sentence or insert the first translation sentence into the second electronic document according to a user command. If the second sentence included in the second electronic document is converted or the first translation sentence is inserted into the second electronic document as described above, the terminal apparatus 300 transmits route information where the second electronic document is stored and link information including position information of the second translation sentence converted into the first translation sentence to the translation apparatus 200.

If link information is additionally received from the terminal apparatus 300 after the first translation sentence is transmitted to the terminal apparatus 300, the storage unit 250 includes and stores the additionally received link information (hereinafter referred to as second link information) in metadata including a sentence received from the terminal apparatus 300 and link information (hereafter referred to as first link information) about the sentence.

Thereafter, if a translation engine module is updated, the language converter 220 acquires a sentence translated into a first translation sentence from metadata pre-stored in the storage unit 250. The language converter 220 retranslates the corresponding sentence by using the updated translation engine module. If the sentence is retranslated into a second translation sentence, the communicator 260 extracts identification information from at least one of first link information and second link information included in the corresponding metadata and transmits the retranslated second translation sentence, and first and second link information to the terminal apparatus 300 corresponding to the extracted identification information. Therefore, the terminal apparatus 300, such as a smartphone, a tablet PC, or a PC, extracts first and second electronic documents including a first translation sentence pre-translated in relation to a partial sentence translation based on route information included in the first and second link information received from the translation apparatus 200. Thereafter, the terminal apparatus 300 tracks a first translation sentence pre-translated in relation to first and second sentences from first and second electronic documents pre-extracted based on position information included in first and second link information and converts the tracked first translation sentence into a second translation sentence.

Therefore, first and second sentences respectively included in first and second electronic documents are automatically converted from first translation sentences into second translation sentences.

The communicator 260 may receive a sentence requested by the user to be translated and link information related to the sentence from at least one of the first through third terminal apparatuses 300-1 through 300-3 by performing a data communication with at least one of the first through third terminal apparatuses 300-1 through 300-3 that are communicable. Also, the communicator 260 may transmit at least one selected from a translation sentence translated in relation to a sentence requested by the user to be translated and link information for updating the translation sentence as a translation sentence translated through a latest version of a translation engine module to at least one of the first through third terminal apparatuses 300-1 through 300-3.

If the communicator 260 performs a data communication according to a wire communication method, the communicator 260 may perform a data communication with at least one of the first through third terminal apparatuses 300-1 through 300-3 by using a Local Area Network (LAN), a Wide Area Network (WAN), Ethernet, or the like.

If the communicator 260 performs a data communication according to a wireless communication method, the communicator 260 may include various types of communication modules such as a short-range wireless communication module, a wireless communication module, and the like. Here, the short-range wireless communication module is a module that wirelessly performs a short-range communication with an external device and may be realized as at least one selected from a Bluetooth module, an Infrared Data Association (IrDAT) module, a Near Field Communication (NFC) module, a wireless fidelity (WIFI) module, and a Zigbee module. The wireless communication module is a module that is connected to an external network to perform a communication according to a wireless communication protocol such as WIFI, Institute of Electrical and Electronics Engineers (IEEE), or the like. Besides this, the wireless communication module may further include a mobile communication module that accesses a mobile communication network to perform a communication according to various types of mobile communication standards such as $3^{rd}$ Generation (3G), $3^{rd}$ Generation Partnership Project (3GPP), Long Term Evolution (LTE), and the like.

The language converter 220 performs a conversion into a language corresponding to a user command through a well-known translation algorithm, and a process of performing a conversion into a language corresponding to a user command through the language converter 220 will be described in brief.

Figure 3:
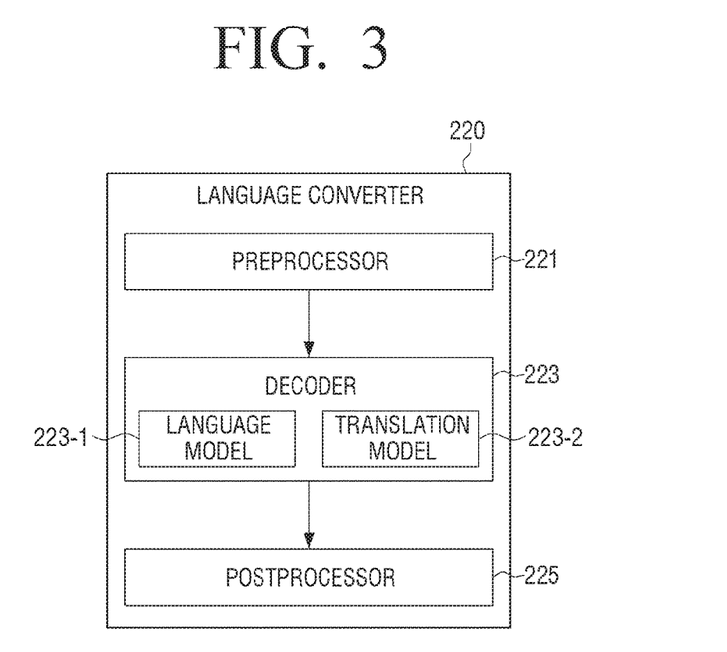
FIG. 3 is a detailed block diagram of a language converter according to an exemplary embodiment.

FIG. 3 is a detailed block diagram of the language converter 220, according to an exemplary embodiment.

As shown in FIG. 3, the language converter 220 includes a preprocessor 221, a decoder 223, and a postprocessor 225.

The preprocessor 221 generates source language words to which tags indicating characteristics of morphemes are attached, by analyzing morphemes of a sentence input or received from an external source. Thereafter, the preprocessor 221 performs normalization processing by combining source language words, to which tags are attached, to generate one sentence.

The decoder 223 translates each of source language words, to which tags are attached, into a sentence of a language corresponding to a user command by using a language model 223-1 and a translation model 223-2. Here, the decoder 223 may translate each of the source language words into the sentence of the language corresponding to the user command based on a statistics-based machine translation method. In detail, the decoder 223 may acquire a natural translation result through a process of making a generation model induced from the language model 223-1 and the translation model 223-2 by applying Bayes Theorem.

The postprocessor 225 may finally generate a translation sentence having a form close to a language corresponding to a user command by adding a tense, punctuation marks, a person, and the like to the translation result translated through the decoder 223 or revise the translation result.

Elements of the translation apparatus 200 according to an exemplary embodiment have been described in detail. Hereinafter, elements of the terminal apparatus 300 according to an exemplary embodiment will be described in detail.

Figure 4:
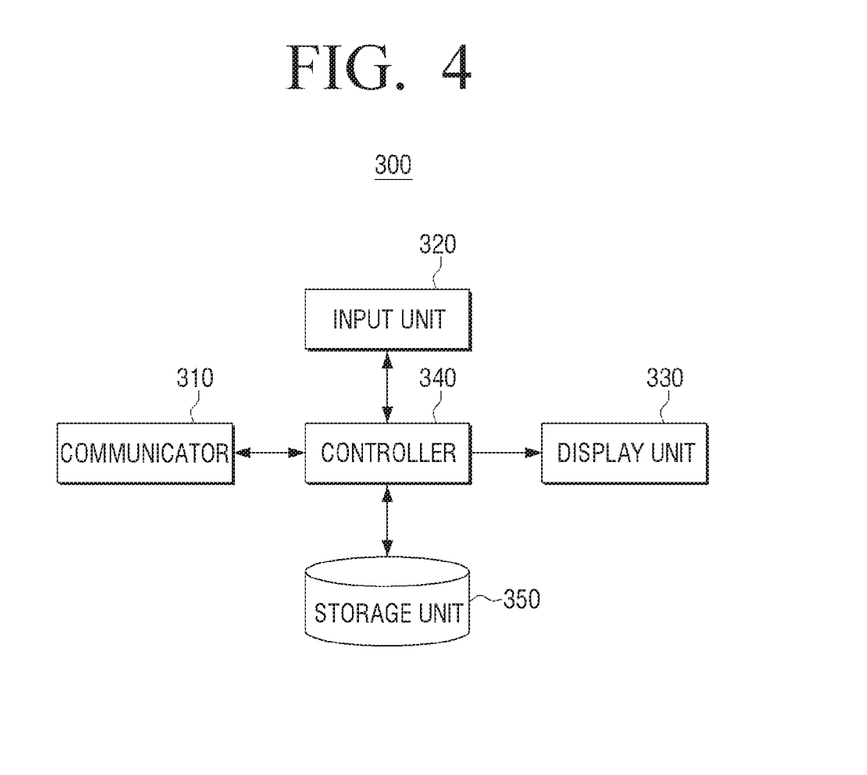
FIG. 4 is a block diagram of a terminal apparatus according to an exemplary embodiment.

FIG. 4 is a block diagram of the terminal apparatus 300, according to an exemplary embodiment.

If the terminal apparatus 300 is an electronic device such as a smartphone, a tablet PC, or the like as described above, the terminal apparatus 300 may include a communicator 310, an input unit 320 (e.g., input interface), a display unit 330 (e.g., display), a controller 340, and a storage unit 350 (e.g., memory) as shown in FIG. 4.

If the communicator 310 performs data communication according to a wire communication method, the communicator 310 may perform a data communication with at least one of the first through third terminal apparatuses 300-1 through 300-3 by using an LAN, a WAN, Ethernet, or the like. If the communicator 310 performs a data communication according to a wireless communication method, the communicator 310 may include various types of communication modules such as a short-range wireless communication module, a wireless communication module, and the like. Here, the short-range wireless communication module wirelessly performs a short-range communication with an external device and may be realized as at least one selected from a Bluetooth module, an IrDA module, an NFC module, a Wi-Fi module, and a Zigbee module. The wireless communication module is a module that is connected to an external network to perform a communication according to a wireless communication protocol such as Wi-Fi, IEEE, or the like. Besides this, the wireless communication module may further include a mobile communication module that performs a communication by accessing a mobile communication network according to various types of mobile communication standards such as 3G, 3GPP, LTE, and the like.

As described above, the communicator 310 may be realized by the above-described various wireless communication methods and may use other communication technologies that are not mentioned in the present disclosure.

The input unit 320 (e.g., input interface) is an input means for receiving various types of user commands and transmitting the various types of user commands to the controller 340 and may receive a manipulation command of a user or a touch command of the user. If the input unit 320 receives the manipulation command of the user, the input unit 320 may be realized as a keypad including various function keys, number keys, special keys, character keys, and the like. If the input unit 320 receives the touch command of the user, the input unit 320 may be realized as a touch pad forming a mutual layer structure with the display unit 330 realized as a touch screen type.

The display unit 330 may display an execution screen of an application executed according to a user command and a webpage execution screen or may display an image content that is received from an external source such as a content server and image-processed by the controller 340. The display unit 330 may be realized as a Liquid Crystal Display (LCD), an Organic Light Emitting Diode (OLED), a Plasma Display Panel (PDP), or the like. If the input unit 320 is realized as the touch pad as described above, the display unit 330 may be realized as a touch screen type forming a mutual layer structure along with the input unit 320 realized as the touch pad.

The controller 340 controls overall operations of elements configuring the terminal apparatus 300. In particular, if a user command for a translation is input when a webpage screen or an electronic document is displayed, the controller 340 controls the communicator 310 to generate translation request information including a sentence corresponding to a user command among sentences included in the displayed webpage screen or electronic document and link information indicating a position of the sentence and transmit the translation request information to the translation apparatus 200. Also, if at least one selected from a translation sentence translated in relation to a sentence corresponding to a user command and link information is received from the translation apparatus 200 through the communicator 310, the controller 340 may convert the sentence corresponding to the user command into a translation sentence received from the translation apparatus 200 based on the received link information.

The storage unit 350 may store an electronic document worked by the user, contents, and application programs for respectively executing a plurality of applications. The storage unit 350 may also store an operating system (O/S) program for controlling an operation of the terminal apparatus 300. If the terminal apparatus 300 is turned on, the O/S program may be an execution program that is read from the storage unit 350, is compiled, and operates elements of the terminal apparatus 300. The storage unit 350 may be realized as at least one selected from a read only memory (ROM), a random access memory (RAM), a memory card (e.g., a Secure Digital (SD) card, a memory stick, or the like) detached from and/or attached to a display apparatus, a non-volatile memory, a volatile memory, a hard disk drive (HDD), and a solid state drive (SSD).

Elements of the translation apparatus 200 and the terminal apparatus 300 according to an exemplary embodiment have been respectively described. Hereinafter, various types of operations of providing the terminal apparatus 300 with a result translated in the translation apparatus 200 according to one or more exemplary embodiments will be described in detail.

Figure 5:
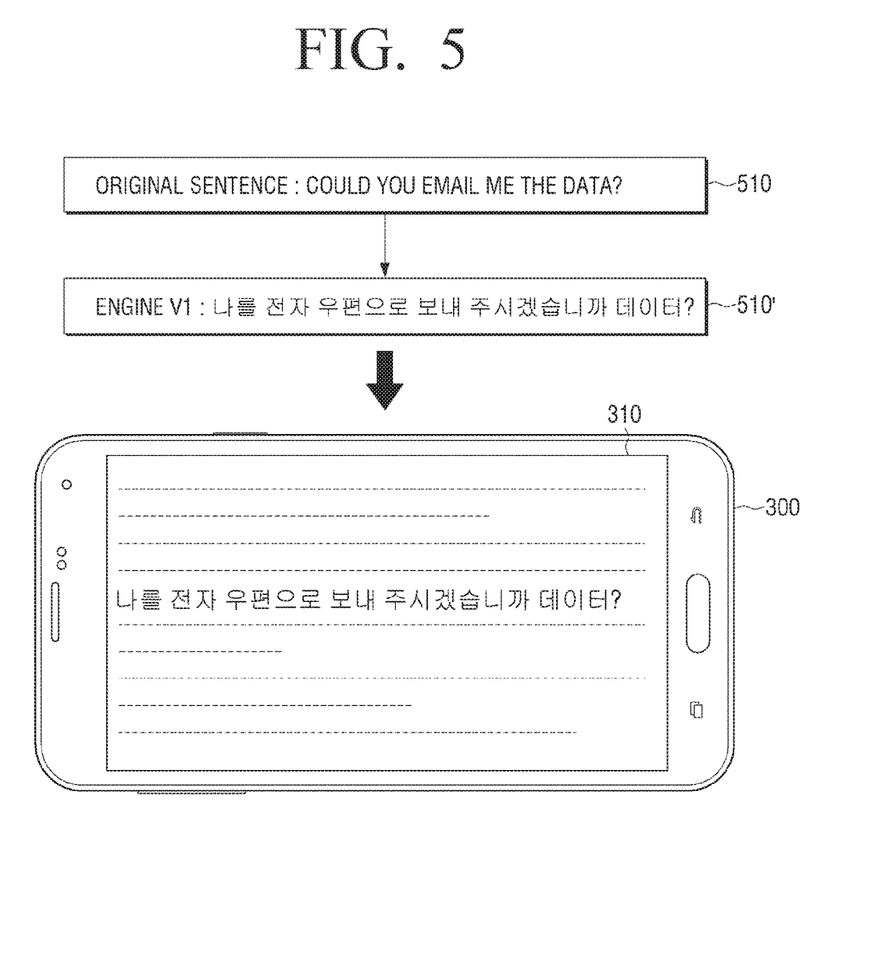
FIG. 5 illustrates an operation of providing a terminal apparatus with a result translated through a translation engine module in a translation apparatus, according to an exemplary embodiment.

FIG. 5 illustrates an operation of providing a terminal apparatus with a result translated through a translation engine module in a translation apparatus, according to an exemplary embodiment.

As shown in FIG. 5, the terminal apparatus 300 may execute and display an electronic document 310 corresponding to a user command. When the electronic document 310 is displayed, a user may request "Could you email me the data?" included in the electronic document 310 to be translated into Korean language. If a translation request as described above is input, the terminal apparatus 300 selects a source sentence of "Could you email me the data?" requested to be translated among sentences included in the displayed electronic document 310. Also, the terminal apparatus 300 acquires position information where the corresponding source sentence is positioned, based on a program (e.g., XML schema information or an API source) forming the electronic document 310. Thereafter, the terminal apparatus 300 transmits link information, which includes the position information where the source sentence is positioned and route information where the electronic document 310 is stored, to the translation apparatus 200.

If the link information is received from the terminal apparatus 300, the translation apparatus 200 translates a source sentence included in translation request information into Korean language by using V1 version of a translation engine module that is a current version. For example, the source sentence "Could you email me the data?" (510) may be translated into Korean language "나를 전자 우편으로 보내 주시겠습니까 데이터?" (510') through the V1 version of the translation engine module. If a source sentence is translated into Korean language as described above, the translation apparatus 200 transmits a first translation sentence translated into Korean language to the terminal apparatus 300. Here, the translation apparatus 200 may transmit link information received from the terminal apparatus 300 along with the first translation sentence.

Therefore, the terminal apparatus 200 may track a source sentence requested to be translated based on position information included in link information received from the translation apparatus 200, convert the tracked source sentence into a first translation sentence received from the translation apparatus 200, and display the first translation sentence. In other words, the terminal apparatus 300 may convert the source sentence "Could you email me the data?" requested to be translated among sentences included in the electronic document 310 into Korean language "나를 전자 우편으 로 보내주시겠습 니까 데이터?" and display the Korean language "나를 전자 우편으 로 보내주시겠습니 까 데이터?".

Figure 6:
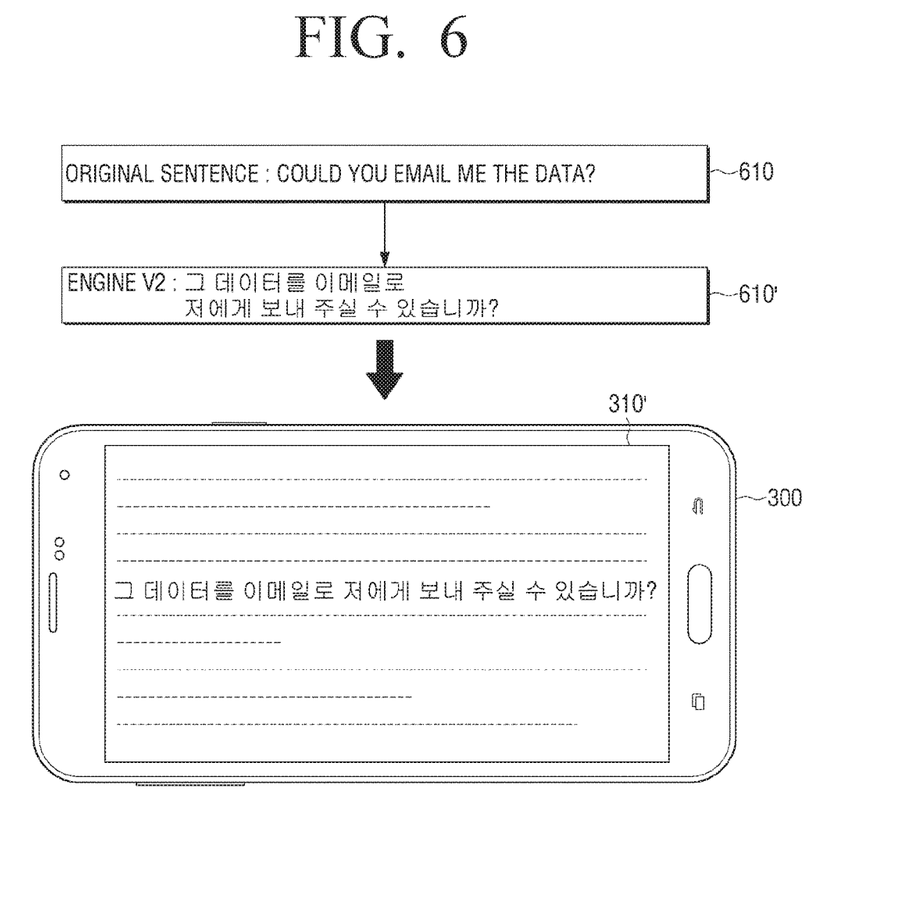
FIG. 6 illustrates an operation of providing a terminal apparatus with a result translated through an updated translation engine module in a translation apparatus, according to an exemplary embodiment.

FIG. 6 illustrates an operation of providing a terminal apparatus with a result translated through an updated translation engine module in a translation apparatus, according to an exemplary embodiment.

As described above with reference to FIG. 5, the terminal apparatus 300 may store the electronic document 310 including a sentence translated from the source sentence "Could you email me the data?" into a first translation sentence " 나를 전자 우편 으로 보내 주시겠습니까 데이터 ?", according to a user request.

A translation engine module that translates the above-described source sentence into a language corresponding to a user command may be updated from V1 version to V2 version. If the translation engine module is updated as the V2 version as described above, the translation apparatus 200 acquires the above-described source sentence and link information from pre-stored metadata. Thereafter, the translation apparatus 200 translates a pre-acquired source sentence by using the translation engine module updated as the V2 version. As shown in FIG. 6, a source sentence "Could you email me the data?" (610) may be retranslated into Korean language " 그 데이터를 이메일로 저에게 보내 주실 수 있습니까 ?" (610') through the translation engine module updated as the V2 version. If the source sentence is retranslated through the translation engine module updated as the V2 version as described above, the translation apparatus 200 transmits link information pre-acquired from metadata and a second translation sentence retranslated in relation to the source sentence to the terminal apparatus 300.

Therefore, the terminal apparatus 300 acquires route information and position information from link information received from the translation apparatus 200, tracks a first translation sentence pre-translated in relation to a source sentence based on the acquired route information and position information, and automatically converts the tracked first translation sentence into a second translation sentence. As a result, the terminal apparatus 300 may store or display an electronic document 310' including a second translation sentence retranslated in relation to a source sentence. In other words, the terminal apparatus 300 automatically converts a first translation sentence " 나를 전자 우편으 로 보내 주시겠 습니까 데이터 ?" pre-translated in relation to a source sentence into a second translation sentence "Could you email me the data?". Thereafter, the terminal apparatus 300 may store or display the electronic document 310' including the second translation sentence "Could you email me the data?" according to a user command.

Figure 7:
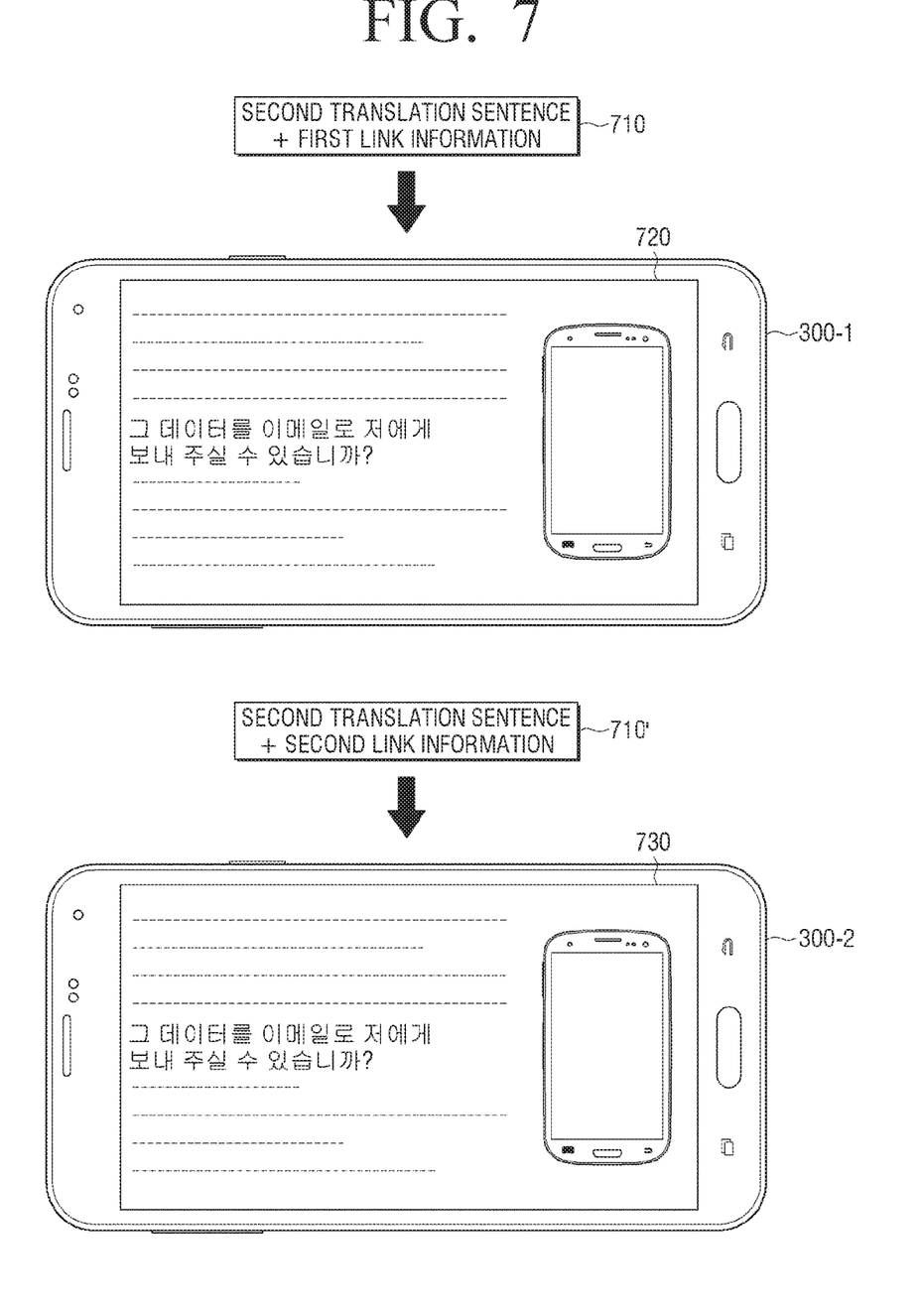
FIG. 7 illustrates an operation of providing a terminal apparatus with a result translated through an updated translation engine module in a translation apparatus, according to another exemplary embodiment.

FIG. 7 illustrates an operation of providing a terminal apparatus with a result translated through an updated translation engine module in a translation apparatus, according to another exemplary embodiment.

As described above with reference to FIG. 5, the terminal apparatus 300 may store the electronic document 310 including a sentence, which is translated from a source sentence "Could you email me the data?" into a first translation sentence " 나를 전자 우편으로 보내 주시겠습니까 데이터 ?", according to a user request. Here, a user may copy the electronic document 310 stored in the terminal apparatus 300 and store the copied electronic document 310 in another terminal apparatus or may copy a first translation sentence included in the electronic document 310 into another electronic document and store the first translation sentence in the terminal apparatus 300.

In detail, as shown in FIG. 7, the first terminal apparatus 300-1 may store or display a first electronic document 720 including a first translation sentence, which is translated into Korean language "나를 전자 우편으로 보내 주시겠습 니까 데이터 ?" in relation to a source sentence "Could you email me the data?", according to a user request. Also, the second terminal apparatus 300-2 may perform editing, such as an insertion of a first translation sentence included in the first electronic document 720 into an area of a second electronic document 730 pre-stored in the second terminal apparatus 300-2, and the like, and then store or display the second electronic document 730 to which the first translation sentence is added, according to a user request.

In other words, the first electronic document 300-1 stored in the first terminal apparatus 300-1 and the second electronic document 730 stored in the second terminal apparatus 300-2 may respectively include a first translation sentence 300-1 that is translated into Korean language "'나를 전자 우편으로 보내 주시겠습 니까 데이터 ?" in relation to the source sentence "Could you email me the data?".

If an event where a first translation sentence is inserted into the second electronic document 730 occurs, the second terminal apparatus 300-2 transmits link information, which includes position where the first translation sentence is inserted into the second electronic document 730 and route information where the second electronic document 730 is stored, to the translation apparatus 200. Here, the second terminal apparatus 300-2 may transmit the first translation sentence along with link information about the second electronic document 730 including the first translation sentence to the translation apparatus 200.

Therefore, the translation apparatus 200 extracts metadata related to the first translation sentence by comparing the first translation sentence received from the second terminal apparatus 300-2 with translation history information and additionally includes the link information received from the second terminal apparatus 300-2 in the extracted metadata. Therefore, a source sentence received from the first terminal apparatus 300-1, link information related to the source sentence, and link information received from the second terminal apparatus 300-2 may be matched and stored in the corresponding metadata.

A translation engine module may be updated from V1 version into V2 version. If the translation engine module is updated as the V2 version as described above, the translation apparatus 200 acquires the above-described source sentence and link information (hereinafter referred to as first and second link information) related to the first and second terminal apparatuses 300-1 and 300-2 from pre-stored metadata. Thereafter, the translation apparatus 200 translates the acquired source sentence into a language requested by the user by using the translation engine module updated as the V2 version. As described above with reference to FIG. 6, the source sentence "Could you email me the data?" may be retranslated into Korean language " 그 데이터를 이메일로 저에게 보내 주실 수 있습니까 ?" through the translation engine module updated as the V2 version.

If the source sentence is retranslated through the translation engine module updated as the V2 version as described above, the translation apparatus 200 transmits translation result information 710 including first link information pre-acquired from metadata and a second translation sentence retranslated in relation to the source sentence to the first terminal apparatus 300-1. Also, the translation apparatus 200 transmits translation result information 710', which includes second link information pre-acquired from metadata and a second translation sentence retranslated in relation to source information, to the second terminal apparatus 300-2.

Therefore, the first terminal apparatus 300-1 acquires route information and position information from link information included in the translation result information 710 received from the translation apparatus 200, tracks a first translation sentence pre-translated in relation to a source sentence based on the acquired route information and position information, and automatically converts the tracked first translation sentence into a second translation sentence. As a result, the first terminal apparatus 300-1 may store or display a first electronic document 720 including a second translation sentence retranslated in relation to a source sentence. In other words, the first terminal apparatus 300-1 automatically converts a first translation sentence "나를 전자 우편으로 보내 주시겠습니까 데이터?" pre-translated in relation to a source sentence into a second translation sentence "Could you email me the data?". Thereafter, the first terminal apparatus 300-1 may store or display the first electronic document 720 including the second translation sentence "Could you email me the data?" according to a user command.

Similarly, the second terminal apparatus 300-2 acquires route information and position information from link information included in translation result information 710' received from the translation apparatus 200, tracks a first translation sentence inserted into a second electronic document 730 based on the acquired route information and position information, and automatically converts the tracked first translation sentence into a second translation sentence. Therefore, the second terminal apparatus 300-2 may store or display the second electronic document 730 including the second translation sentence. In other words, the second terminal apparatus 300-2 automatically converts a first translation sentence "나를 전자 우편으로 보내 주시겠습니까 데이터?" pre-inserted into the second electronic document 730 into a second translation sentence "Could you email me the data?". Thereafter, the second terminal apparatus 300-2 may store or display the second electronic document 730 including the second translation sentence "Could you email me the data?" according to a user command.

Hereinafter, a control method of a translation apparatus according to an exemplary embodiment will be described.

Figure 8:
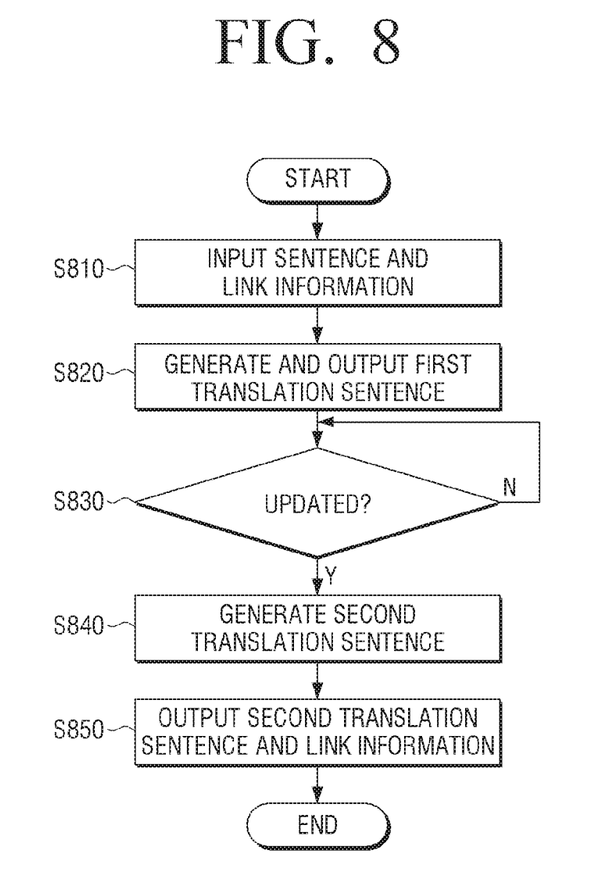
FIG. 8 is a flowchart of a control method of a translation apparatus, according to an exemplary embodiment.

FIG. 8 is a flowchart of a control method of a translation apparatus according to an exemplary embodiment.

As shown in FIG. 8, if a sentence to be translated and link information about the sentence are input from an external source, the translation apparatus 200 generates a first translation sentence by translating the input sentence into a language corresponding to a user command by using a translation engine module and outputs the generated first translation sentence in operations S810 and S820. The translation apparatus 200 determines whether the translation engine module is updated as a new version and, if the translation engine module is updated as the new version, generates a second translation sentence by retranslating a sentence translated into a first translation sentence by using the updated translation engine module in operations S830 and S840. In operation S850, the translation apparatus 200 outputs the second translation sentence retranslated through the updated translation engine module and link information.

Here, if the sentence input from the external source is a whole sentence included in a webpage, the link information may include address information about the corresponding webpage. Also, the sentence and the link information related to the sentence may be generated and stored in a metadata form.

In this case, if the translation engine module is updated, the translation apparatus 200 acquires a sentence translated into a first translation sentence from pre-stored metadata. Thereafter, the translation apparatus 200 retranslates the corresponding sentence by using the updated translation engine module. If the sentence is translated into a second translation sentence, the translation apparatus 200 outputs the link information included in the corresponding metadata and the retranslated second translation sentence. Therefore, the terminal apparatus 300 that requests translation determines a webpage including a first translation sentence pre-translated in relation to a whole sentence translation based on the link information output from the translation apparatus 200 and converts the first translation sentence of the determined webpage into a second translation sentence.

If the input sentence is a partial sentence included in the webpage, the link information may include address information and position information about the corresponding webpage. Here, according to an exemplary embodiment, the position information may be code information corresponding to a sentence to be translated from a source program having an HTML form forming a webpage or information where the corresponding code information is positioned. A sentence as described above and link information related to the sentence may be generated and stored in a metadata form.

In this case, if a translation engine module is updated, the translation apparatus 200 acquires a sentence translated into a first translation sentence from pre-stored metadata. Thereafter, the translation apparatus 200 retranslates the corresponding sentence by using the updated translation engine module. If the sentence is translated into a second translation sentence, the translation apparatus 200 outputs link information included in the corresponding metadata and the retranslated second translation sentence. Therefore, the terminal apparatus 300 that requests a translation determines a webpage including a first translation sentence pre-translated in relation to a partial sentence based on the link information output from the translation apparatus 200. Thereafter, the terminal apparatus 300 tracks a first translation sentence pre-translated in relation to the partial sentence from the webpage pre-determined based on position information included in the link information and converts the tracked first translation sentence into a second translation sentence.

If the input sentence is a whole sentence included in an electronic document, the link information may include route information where the electronic document is stored. Also, the sentence described above and the link information related to the sentence may be generated and stored in a metadata form.

In this case, if a translation engine module is updated, the translation apparatus 200 acquires a sentence translated into a first translation sentence from pre-stored metadata. Thereafter, the translation apparatus 200 retranslates the corresponding sentence by using the updated translation engine module. If the sentence is retranslated into a second translation sentence, the translation apparatus 200 extracts identification information from the link information included in the corresponding metadata and transmits the retranslated second translation sentence and the link information to the terminal apparatus 300 corresponding to the extracted identification information. Therefore, the terminal apparatus 300, such as a smartphone, a tablet PC, or a PC, extracts an electronic document including a first translation sentence pre-translated in relation to a whole sentence translation based on route information included in link information received from the translation apparatus 200 and converts the first translation sentence of the extracted electronic document into a second translation sentence.

If the input sentence is a partial sentence included in the electronic document, the link information may include route information where the corresponding electronic sentence is stored and position information of the corresponding sentence. Here, if the electronic document is a document of an office open file form having an extension such as docx, docm, pptx, xlsx, or the like, the position information may be information acquired from XML schema information forming the electronic document according to an exemplary embodiment.

If the electronic document is a document of an office file form having an extension such as doc, ppt, xls, or the like, the position information may be information acquired based on an API source opened in relation to the electronic document. The sentence described above and the link information related to the sentence may be generated and stored in a metadata form.

If the link information related to the first translation sentence is additionally received after outputting the first translation sentence through operation S820 described above, the translation apparatus 200 outputs the second translation sentence, the link information, and the additionally received link information.

For example, if a first translation sentence related to a first sentence requested to be translated among sentences included in a first electronic document is received from the translation apparatus 200, the terminal apparatus 300 converts the first sentence into the received first translation sentence. When the first sentence included in the first electronic document is converted into the first translation sentence as described above, the terminal apparatus 300 may convert a second sentence of sentences included in a second electronic document into the first translation sentence or may insert the first translation sentence into the second electronic document according to a user command. If the second sentence included in the second electronic document is converted into the first translation sentence or the first translation sentence is inserted into the second electronic document as described above, the terminal apparatus 300 transmits link information including route information where the second electronic document is stored and position information of the second sentence to the translation apparatus 200.

Therefore, the terminal apparatus 300 extracts first and second electronic documents including a first translation sentence pre-translated based on route information included in first and second link information received from the translation apparatus 200. Thereafter, the terminal apparatus 300 tracks a first translation sentence pre-translated in relation to first and second sentences from first and second electronic documents pre-extracted based on position information included in first and second link information and converts the tracked first translation sentence into a second translation sentence.

Therefore, the first and second sentences respectively included in the first and second electronic documents are automatically converted from the first translation sentence into the second translation sentence.

The foregoing exemplary embodiments and advantages are merely exemplary and are not to be construed as limiting the present invention. The present disclosure can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A control method of a translation apparatus, the control method comprising:
   receiving a sentence and link information about the sentence from an external device;
   obtaining a first translation sentence translated from the sentence by using a translation engine;
   providing the first translation sentence and the link information to the external device;
   storing the sentence and the link information;
   in response to the translation engine being updated, retrieving the sentence and the link information and obtaining a second translation sentence translated from the retrieved sentence by using the updated translation engine; and
   providing the second translation sentence and the retrieved link information to the external device,
   wherein the link information provided to the external device is for the external device to locate the first translation sentence and replace the first translation sentence with the second translation sentence.

2. The control method of claim 1, wherein in response to the sentence being a whole sentence in a webpage, the link information comprises address information of the webpage.

3. The control method of claim 1, wherein in response to the sentence being a partial sentence in a webpage, the link information comprises address information of the webpage and position information of the sentence.

4. The control method of claim 3, wherein the position information is information acquired from a source program which configures the webpage.

5. The control method of claim 1, wherein in response to the sentence being a whole sentence in an electronic document, the link information comprises route information where the electronic document is stored.

6. The control method of claim 1, wherein in response to the sentence being a partial sentence in an electronic document, the link information comprises route information where the electronic document is stored and position information of the sentence.

7. The control method of claim 6, wherein in response to the electronic document being a document of an office open file form, the position information is information acquired from Extensible Mark-up Language (XML) schema information forming the electronic document.

8. The control method of claim 6, wherein in response to the electronic document being a document of an office file form, the position information is information acquired based on an Application Program Interface (API) source opened in relation to the electronic document.

9. The control method of claim 1, wherein the providing of the second translation sentence comprises, in response to link information related to the first translation sentence being additionally received after the first translation sentence is provided, providing the second translation sentence, the link information, and the additionally received link information to the external device.

10. A translation apparatus comprising:
    a communicator;
    a memory; and
    at least one processor configured to:
       in response to receiving a sentence and link information about the sentence from an external device, obtain a first translation sentence translated from the sentence by using a translation engine;
       control the communicator to transmit the first translation sentence and the link information to the external device
       store the sentence and the link information in the memory;
       in response to the translation engine being updated according to updated version information, retrieve the sentence and the link information from the memory and obtain a second translation sentence translated from the retrieved sentence by using the updated translation engine; and control the communicator to transmit the second translation sentence and the retrieved link information to the external device, wherein the link information provided to the external device is for the external device to locate the first translation sentence and replace the first translation sentence with the second translation sentence.

11. The translation apparatus of claim 10, wherein in response to the sentence being a whole sentence in a webpage, the link information comprises address information of the webpage.

12. The translation apparatus of claim 10, wherein in response to the sentence being a partial sentence in a webpage, the link information comprises address information of the webpage and position information of the sentence.

13. The translation apparatus of claim 12, wherein the position information is information acquired from a source program forming the webpage.

14. The translation apparatus of claim 10, wherein in response to the sentence being a partial sentence in an electronic document, the link information comprises route information where the electronic document is stored.

15. The translation apparatus of claim 10, wherein in response to the sentence being a partial sentence in an electronic document, the link information comprises route information where the electronic document is stored and position information of the sentence.

* * * * *